United States Patent
DeSantiago et al.

(10) Patent No.: US 10,264,629 B2
(45) Date of Patent: Apr. 16, 2019

(54) INFRARED HEAT LAMP ASSEMBLY

(71) Applicants: Arturo DeSantiago, El Paso, TX (US); Alfonso Barrios, Juarez (MX); German Calvo, Juarez (MX)

(72) Inventors: Arturo DeSantiago, El Paso, TX (US); Alfonso Barrios, Juarez (MX); German Calvo, Juarez (MX)

(73) Assignee: OSRAM SYLVANIA INC., Wilmington, MA (US)

( * ) Notice: Subject to any disclaimer, the term of this patent is extended or adjusted under 35 U.S.C. 154(b) by 1278 days.

(21) Appl. No.: 13/905,583

(22) Filed: May 30, 2013

(65) Prior Publication Data

US 2014/0355971 A1    Dec. 4, 2014

(51) Int. Cl.
  *H05B 3/00* (2006.01)
  *H05B 3/44* (2006.01)
  *B29C 65/14* (2006.01)

(52) U.S. Cl.
  CPC ............ *H05B 3/44* (2013.01); *B29C 65/1412* (2013.01); *H05B 2203/014* (2013.01); *H05B 2203/032* (2013.01)

(58) Field of Classification Search
  CPC ...... H05B 3/00; H05B 3/44; H05B 2203/032; H05B 2203/014; B29C 65/1412
  USPC .... 392/407; 219/711, 130.21, 411, 552, 553
  See application file for complete search history.

(56) References Cited

U.S. PATENT DOCUMENTS

| | | | | |
|---|---|---|---|---|
| 1,718,970 A | * | 7/1929 | Lonergan | 392/489 |
| 1,824,585 A | * | 9/1931 | Lucia et al. | 219/521 |
| 1,848,499 A | * | 3/1932 | Sperlich et al. | 38/59 |
| 1,851,851 A | * | 3/1932 | Leif et al. | 122/166.1 |
| 1,858,483 A | * | 5/1932 | Conrad | 338/235 |
| 1,947,793 A | * | 2/1934 | O'Neil et al. | 338/235 |
| 1,997,146 A | * | 4/1935 | Hynes | 219/534 |
| 2,007,877 A | * | 7/1935 | Sauvage | 219/542 |
| 2,031,182 A | * | 2/1936 | Smith | 313/273 |
| 2,145,324 A | * | 1/1939 | Stauss et al. | 219/390 |
| 2,149,667 A | * | 3/1939 | Clarke | 392/399 |
| 2,215,587 A | * | 9/1940 | Kerschbaum | 338/237 |
| 2,224,422 A | * | 12/1940 | Ballman | 318/785 |
| 2,297,454 A | * | 9/1942 | Berger | 313/343 |
| 2,317,228 A | * | 4/1943 | Shroyer | 99/328 |
| 2,589,566 A | * | 3/1952 | Neth et al. | 392/479 |
| 2,593,087 A | * | 4/1952 | Baggett | 219/521 |
| 2,614,200 A | * | 10/1952 | McNair | 392/448 |

(Continued)

OTHER PUBLICATIONS

Four (4) incandescent tubular style lamps marketed on Amazon website www.amazon.com visited on Feb. 14, 2013 (1 page).

*Primary Examiner* — Eric Stapleton
(74) *Attorney, Agent, or Firm* — Edward S. Podszus (57) ABSTRACT

An infrared heat lamp (200) includes a heating element (214) wound about and supported by an inner tubular member (224) and an outer tubular member (202) enclosing the inner tubular member (224) and heating element (214). The outer tubular member (202) includes an open first end (204) having a flange member (212) defined along an outer periphery thereof and a dome-like second end (206). The infrared heat lamp (200) further includes a base member (230) having first and second discrete portions (232, 234) secured to one another by a fastener (238) and retaining the flange member (212) of the open first end (204) of the outer tubular member (202) therebetween.

17 Claims, 8 Drawing Sheets

(56) References Cited

U.S. PATENT DOCUMENTS

| | | | |
|---|---|---|---|
| 2,663,824 A * | 12/1953 | Colaiaco et al. | 315/106 |
| 2,733,333 A * | 1/1956 | Peters | 392/393 |
| 2,824,199 A * | 2/1958 | Browne | 338/241 |
| 2,864,025 A * | 12/1958 | Foote et al. | 313/279 |
| 2,913,565 A * | 11/1959 | Von Kantzow | 219/449.1 |
| 2,969,412 A * | 1/1961 | Frank | 373/110 |
| 3,039,015 A * | 6/1962 | Jolly | 313/279 |
| 3,088,017 A * | 4/1963 | Schomann | 392/494 |
| 3,211,943 A * | 10/1965 | Cardwell, Jr. | 313/315 |
| 3,219,872 A * | 11/1965 | Hodge | 313/316 |
| 3,225,247 A * | 12/1965 | Audesse et al. | 313/271 |
| 3,265,862 A * | 8/1966 | Smith, Jr. et al. | 219/405 |
| 3,295,007 A * | 12/1966 | Young | 313/273 |
| 3,310,769 A * | 3/1967 | Simmons | 338/241 |
| 3,313,921 A * | 4/1967 | Mohn et al. | 219/553 |
| 3,335,312 A * | 8/1967 | Cardwell, Jr. | 313/279 |
| 3,428,846 A * | 2/1969 | Rigden et al. | 313/284 |
| 3,443,144 A * | 5/1969 | Freese, Jr. | 313/315 |
| 3,448,319 A * | 6/1969 | Louden | 220/2.1 R |
| 3,461,275 A * | 8/1969 | Poole | 219/553 |
| 3,512,114 A * | 5/1970 | Dzaack | 338/241 |
| 3,538,374 A * | 11/1970 | Kane | 313/273 |
| 3,560,705 A * | 2/1971 | Mendenhall | 219/265 |
| 3,571,477 A * | 3/1971 | Phillips | 373/110 |
| 3,579,021 A * | 5/1971 | Kimball | 313/274 |
| 3,585,359 A * | 6/1971 | Drugmand | 392/498 |
| 3,617,797 A * | 11/1971 | Meijer et al. | 313/318.12 |
| 3,621,200 A * | 11/1971 | Ridley Watts, Jr. | 392/418 |
| 3,627,989 A * | 12/1971 | Heidler et al. | 219/553 |
| 3,634,722 A * | 1/1972 | Palmer et al. | 313/279 |
| 3,646,322 A * | 2/1972 | Speekman | 219/549 |
| 3,678,249 A * | 7/1972 | Lennox | 219/544 |
| 3,678,319 A * | 7/1972 | Notelteirs et al. | 313/271 |
| 3,691,346 A * | 9/1972 | Dyre et al. | 392/485 |
| 3,699,309 A * | 10/1972 | Eck | 219/553 |
| 3,716,693 A * | 2/1973 | Bleckmann | 219/553 |
| 3,736,455 A * | 5/1973 | Notelteirs et al. | 313/274 |
| 3,779,710 A * | 12/1973 | Burstein et al. | 422/121 |
| 3,804,967 A * | 4/1974 | Werych | 373/119 |
| 3,927,301 A * | 12/1975 | Heuel et al. | 219/523 |
| 3,930,178 A * | 12/1975 | Coaton | 313/275 |
| 3,977,073 A * | 8/1976 | Shirey | 29/611 |
| 4,001,622 A * | 1/1977 | Howell | 313/113 |
| 4,041,438 A * | 8/1977 | Landeroin Duvernois | 338/237 |
| 4,048,472 A * | 9/1977 | Sauer et al. | 219/388 |
| 4,056,143 A * | 11/1977 | Martin | 165/176 |
| 4,070,594 A * | 1/1978 | Fuchi et al. | 313/1 |
| 4,080,548 A * | 3/1978 | Johnson | 315/68 |
| 4,103,277 A * | 7/1978 | Griffin et al. | 338/237 |
| 4,119,832 A * | 10/1978 | Audesse et al. | 219/270 |
| 4,270,367 A * | 6/1981 | Santore | 464/169 |
| 4,285,032 A * | 8/1981 | Honda et al. | 362/224 |
| 4,297,562 A * | 10/1981 | Kamogawa et al. | 219/216 |
| 4,301,359 A * | 11/1981 | Ito et al. | 219/469 |
| 4,321,459 A * | 3/1982 | Miyahara et al. | 219/544 |
| 4,324,126 A * | 4/1982 | Riech et al. | 73/1.81 |
| 4,329,622 A * | 5/1982 | Corona et al. | 315/49 |
| 4,379,220 A * | 4/1983 | Middleman et al. | 392/497 |
| 4,395,619 A * | 7/1983 | Harigai | 392/410 |
| 4,410,796 A * | 10/1983 | Wilsey | 117/210 |
| 4,412,126 A * | 10/1983 | Brockway | 219/553 |
| 4,442,374 A * | 4/1984 | Morris et al. | 313/316 |
| 4,455,319 A * | 6/1984 | Clark | 426/233 |
| 4,483,304 A * | 11/1984 | Yokoi et al. | 123/549 |
| 4,486,639 A * | 12/1984 | Mittelsteadt | 219/685 |
| 4,499,398 A * | 2/1985 | Munroe | 313/113 |
| 4,531,047 A * | 7/1985 | Canfield et al. | 338/268 |
| 4,611,146 A * | 9/1986 | Morrison | 313/146 |
| 4,621,182 A * | 11/1986 | Driggers | 219/85.13 |
| 4,621,220 A * | 11/1986 | Morris et al. | 313/318.02 |
| 4,623,817 A * | 11/1986 | Morris et al. | 313/275 |
| 4,626,735 A * | 12/1986 | Morris et al. | 313/275 |
| 4,682,578 A * | 7/1987 | Schmidt | 126/91 R |
| 4,699,084 A * | 10/1987 | Wilson et al. | 118/725 |
| 4,710,676 A * | 12/1987 | Morris et al. | 313/579 |
| 4,756,091 A * | 7/1988 | Van Denend | 34/266 |
| 4,762,980 A * | 8/1988 | Insley | 392/494 |
| 4,774,396 A * | 9/1988 | Salit et al. | 219/553 |
| 4,775,258 A * | 10/1988 | Lange | 403/171 |
| 4,808,793 A * | 2/1989 | Hurko | 392/489 |
| 4,813,992 A * | 3/1989 | Hale | 65/140 |
| 4,816,649 A * | 3/1989 | Eilentroop | 219/549 |
| 4,835,365 A * | 5/1989 | Etheridge | 392/489 |
| 4,892,432 A * | 1/1990 | Cooper | 403/297 |
| 4,918,355 A * | 4/1990 | Morris et al. | 313/318.07 |
| 5,077,461 A * | 12/1991 | Hasegawa | 219/553 |
| 5,122,640 A * | 6/1992 | Holmes | 219/532 |
| 5,124,534 A * | 6/1992 | Williams et al. | 219/532 |
| 5,128,515 A * | 7/1992 | Tanaka | 219/390 |
| RE34,018 E * | 8/1992 | Petersen et al. | 338/303 |
| 5,167,003 A * | 11/1992 | Montanari et al. | 392/416 |
| 5,212,763 A * | 5/1993 | Arold et al. | 392/488 |
| 5,293,446 A * | 3/1994 | Owens et al. | 392/449 |
| 5,296,686 A * | 3/1994 | Ullrich et al. | 219/553 |
| 5,308,207 A * | 5/1994 | Jaskowiak | 411/513 |
| 5,386,491 A * | 1/1995 | Mewissen et al. | 392/418 |
| 5,400,432 A * | 3/1995 | Kager et al. | 392/492 |
| 5,488,833 A * | 2/1996 | Stewart | 62/55.5 |
| 5,549,078 A * | 8/1996 | Annecharico et al. | 392/398 |
| 5,559,924 A * | 9/1996 | Kadotani et al. | 392/483 |
| 5,587,115 A * | 12/1996 | Allen | 264/1.24 |
| 5,674,424 A * | 10/1997 | Iben et al. | 219/549 |
| 5,676,869 A * | 10/1997 | Nakayama et al. | 219/390 |
| 5,740,315 A * | 4/1998 | Onishi et al. | 392/489 |
| 5,793,017 A * | 8/1998 | Yamada et al. | 219/221 |
| 5,907,663 A * | 5/1999 | Lee | 392/407 |
| 5,910,267 A * | 6/1999 | Stricker | 219/548 |
| 5,930,458 A * | 7/1999 | Yane et al. | 392/482 |
| 5,959,254 A * | 9/1999 | Martin, Sr. | 174/138 J |
| 5,962,973 A * | 10/1999 | Rice | 313/580 |
| 5,991,506 A * | 11/1999 | Platsch | 392/379 |
| 5,995,711 A * | 11/1999 | Fukuoka et al. | 392/347 |
| 6,020,577 A * | 2/2000 | Barker | 219/537 |
| 6,055,360 A * | 4/2000 | Inoue et al. | 392/485 |
| 6,081,072 A * | 6/2000 | Suzuki | 315/46 |
| 6,097,007 A * | 8/2000 | Wang | 219/501 |
| 6,157,778 A * | 12/2000 | Kadotani | 392/483 |
| 6,167,196 A * | 12/2000 | Huggins et al. | 392/424 |
| 6,236,810 B1 * | 5/2001 | Kadotani | 392/483 |
| 6,406,758 B1 * | 6/2002 | Bottari et al. | 427/557 |
| 6,407,371 B1 * | 6/2002 | Toya et al. | 219/553 |
| 6,509,554 B2 * | 1/2003 | Howard et al. | 219/536 |
| D477,855 S * | 7/2003 | Selvaggio | D22/108 |
| 6,591,062 B2 * | 7/2003 | Scherzer et al. | 392/407 |
| 6,593,553 B2 * | 7/2003 | Whitfield | 219/536 |
| 6,614,008 B2 * | 9/2003 | Tidrick | 219/483 |
| 6,706,235 B1 * | 3/2004 | Scherzer et al. | 264/479 |
| 6,748,646 B2 * | 6/2004 | Von Arx et al. | 29/613 |
| 6,765,339 B2 * | 7/2004 | Dieudonne et al. | 313/45 |
| 6,876,816 B2 * | 4/2005 | Shigeoka et al. | 392/411 |
| 6,909,843 B1 * | 6/2005 | Fabrizio | 392/490 |
| 6,980,734 B2 * | 12/2005 | Halpin | 392/407 |
| 7,003,217 B2 * | 2/2006 | Bachinski et al. | 392/411 |
| 7,133,604 B1 * | 11/2006 | Bergstein | 392/379 |
| 7,189,950 B2 * | 3/2007 | Ko | 219/685 |
| 7,194,198 B2 * | 3/2007 | Lee | 392/407 |
| 7,293,914 B2 * | 11/2007 | Wang | 374/141 |
| 7,323,661 B2 * | 1/2008 | Shimizu | 219/390 |
| 7,324,746 B2 * | 1/2008 | Tanaka et al. | 392/465 |
| RE40,181 E * | 3/2008 | Scherzer et al. | 392/407 |
| 7,344,059 B2 * | 3/2008 | Johnson | 228/44.3 |
| 7,441,939 B2 * | 10/2008 | Scholeno et al. | 362/652 |
| 7,471,885 B2 * | 12/2008 | Mizukawa et al. | 392/407 |
| D586,494 S * | 2/2009 | Watanabe et al. | D26/113 |
| D586,495 S * | 2/2009 | Watanabe et al. | D26/113 |
| D586,939 S * | 2/2009 | Watanabe et al. | D26/113 |
| D586,940 S * | 2/2009 | Itakura et al. | D26/113 |
| D586,941 S * | 2/2009 | Itakura et al. | D26/113 |
| 7,489,858 B2 * | 2/2009 | Zank et al. | 392/416 |
| D598,158 S * | 8/2009 | Watanabe et al. | D26/113 |
| 7,592,572 B2 * | 9/2009 | Schlipf | 219/532 |
| 7,593,625 B2 * | 9/2009 | Kamikawa et al. | 392/393 |
| 7,626,147 B2 * | 12/2009 | Lee et al. | 219/548 |
| 7,637,649 B2 * | 12/2009 | Garcia et al. | 362/640 |

(56) References Cited

U.S. PATENT DOCUMENTS

| | | | |
|---|---|---|---|
| 7,639,930 B2* | 12/2009 | Mizukawa et al. | 392/416 |
| 7,690,549 B1* | 4/2010 | Owensby | 228/42 |
| 7,747,147 B2* | 6/2010 | Konishi et al. | 392/407 |
| 7,764,871 B2* | 7/2010 | Rodegher | 392/416 |
| 7,769,278 B2* | 8/2010 | Kim et al. | 392/407 |
| 7,932,665 B2* | 4/2011 | Garcia | 313/272 |
| 8,014,652 B2* | 9/2011 | Suzuki et al. | 392/411 |
| 8,023,806 B2* | 9/2011 | Ichikawa et al. | 392/416 |
| 8,072,128 B2* | 12/2011 | Tanino et al. | 313/316 |
| 8,104,434 B2* | 1/2012 | Fabrizio | 122/40 |
| 8,233,784 B2* | 7/2012 | Zenteno et al. | 392/416 |
| 8,288,932 B2* | 10/2012 | Nakashima et al. | 313/316 |
| 8,396,355 B2* | 3/2013 | Jones | 392/422 |
| 8,426,779 B2* | 4/2013 | Schlipf | 219/481 |
| 8,435,459 B2* | 5/2013 | Reddy et al. | 422/292 |
| 2004/0051313 A1* | 3/2004 | Trouyet | 285/305 |
| 2006/0168756 A1* | 8/2006 | Sato et al. | 16/22 |
| 2006/0222349 A1* | 10/2006 | Sturm et al. | 392/463 |
| 2007/0023418 A1* | 2/2007 | Schlipf | 219/532 |
| 2007/0145038 A1* | 6/2007 | Vissa et al. | 219/535 |
| 2008/0274823 A1* | 11/2008 | Lindner | 473/297 |
| 2009/0025399 A1* | 1/2009 | Kamen et al. | 62/6 |
| 2009/0034947 A1* | 2/2009 | Tsai | 392/407 |
| 2010/0068123 A1* | 3/2010 | Edwin et al. | 423/447.2 |
| 2010/0212752 A1* | 8/2010 | Fima | 137/87.03 |
| 2011/0203781 A1* | 8/2011 | Ellingwood et al. | 165/173 |
| 2011/0233191 A1* | 9/2011 | Gubler et al. | 219/546 |
| 2011/0240269 A1* | 10/2011 | Mackenzie | 165/141 |
| 2012/0275775 A1* | 11/2012 | Iskrenovic | 392/483 |
| 2013/0026904 A1* | 1/2013 | De Santiago et al. | 313/274 |

* cited by examiner

INFRARED HEAT LAMP ASSEMBLY

CROSS REFERENCE TO RELATED APPLICATIONS

N/A

TECHNICAL FIELD

The present disclosure relates generally to a lamp, and, more particularly, to an infrared heat lamp.

BACKGROUND

Infrared heater systems may include infrared heat lamp(s) configured to emit infrared radiation, which, in turn, may be used as a deliberate heating source. For example, an infrared heater system may be used to cook and/or heat food and may also be used in industrial manufacturing processes, including, but not limited to curing of coatings, forming of plastics, annealing, plastic welding, and print drying. Additionally, an infrared heater system may be used to heat a surrounding environment, such as one's home or office.

Figure 1:
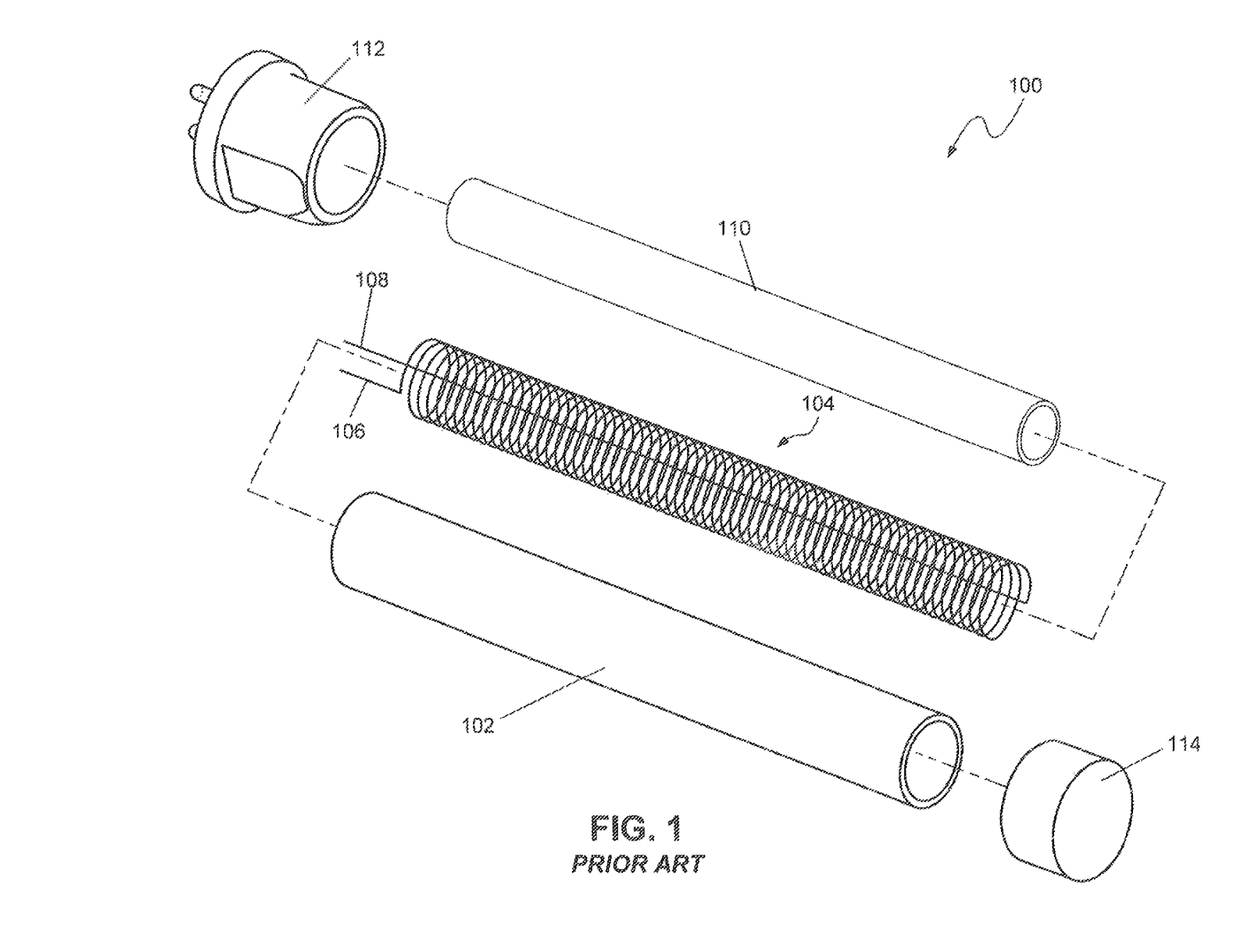
FIG. 1 illustrates an exploded perspective view of a prior art infrared heat lamp.
Figure 2:
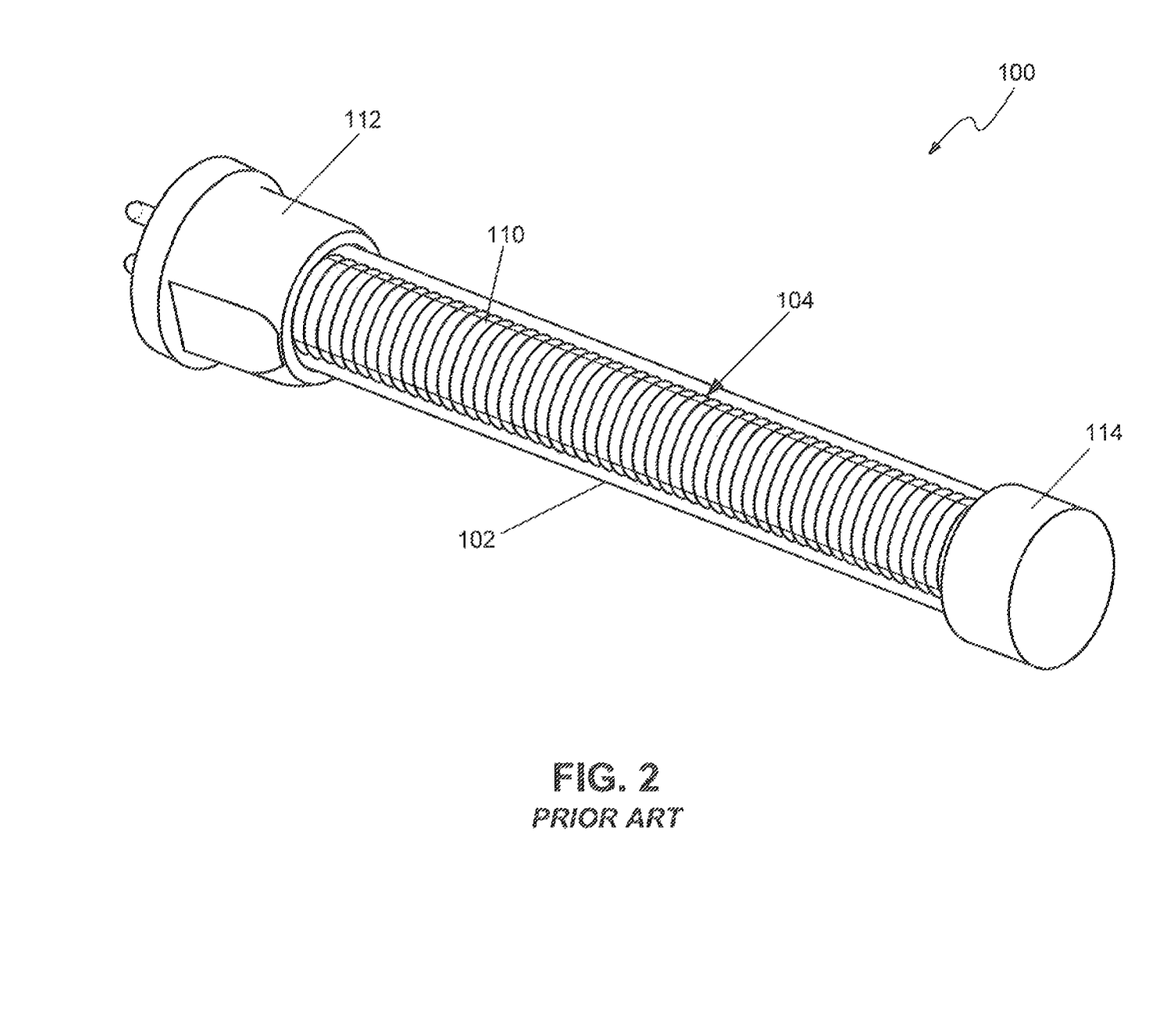
FIG. 2 illustrates a perspective view of the prior art infrared heat lamp of FIG. 1 in an assembled state.

FIG. 1 is an exploded perspective view of a prior art infrared heat lamp, such as one commercially available in the United States from Osram Sylvania Inc. under the designation "J168" rated 500 W 115V and used in portable heaters marketed by the company EdenPURE®. FIG. 2 illustrates a perspective view of the prior art infrared heat tamp of FIG. 1 in an assembled state. The infrared heat lamp 100 includes an outer tubular member 102 and a coiled heating element 104 disposed within the outer tubular member 102. The coiled heating element 104 includes a first terminal end 106 and a second terminal end 108. The coiled heating element 104 is wound about an inner tubular member 110, wherein at least a portion of the second terminal end 108 is disposed within the inner tubular member 110 and insulated from other portions of the heat element 104.

The coiled heating element 104 and the inner tubular member 110 are disposed within the outer tubular member 102, whereby the outer tubular member 102 serves as an insulator for the coiled heating element 104. When in operation, an electric current passes through the coiled heating element 104 by way of the first and second terminal ends 106, 108, thereby heating and causing the heating element 104 to emit infrared radiation, whereby the infrared heat lamp 100 may be used as a heating source in a heater system.

As shown, a first end of the outer tubular member 102 is sealed with a first end cap 112 and a second opposing end of the outer tubular member 102 is sealed with a second end cap 114. The first and second end caps 112, 114 are generally secured to the outer tubular member 102 by way of an adhesive, such as an adhesive cement for bonding/joining the components to one another. However, use of an adhesive as a means of coupling components of the infrared heat lamp 100 to one another may present some disadvantages and drawbacks. For example, some current heat lamps have adherence issues, wherein the adhesive bond between components is insufficient and may not be able withstand operating parameters of the heat lamps, such as, for example, high temperatures. The insufficient bonding between components may result in the detachment of components from one another, which may ultimately pose a risk of damage to the components as well as fire hazard during use.

BRIEF DESCRIPTION OF THE DRAWINGS

Reference should be made to the following detailed description which should be read in conjunction with the following figures, wherein like numerals represent like parts.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient. Also, it should be understood that the phraseology and terminology used herein is for the purpose of description and should not be regarded as limiting.

DETAILED DESCRIPTION

In general, the present disclosure is directed to an infrared heat lamp having a structure facilitating a cement-free configuration. The infrared heat lamp includes an outer tubular member having an open first end having a flange member defined along an outer periphery thereof and a dome-like second end. The infrared heat lamp further includes a heating element wound about an inner tubular member and disposed within the outer tubular member. The heating element is adapted to emit infrared radiation when electric current is passed through the element. The infrared heat lamp further includes a base member having first and second discrete portions secured to one another by a fastener and retaining the flange member of the open first end of the outer tubular member therebetween. The infrared heat lamp is preferably devoid of an adhesive in an amount effective to secure the base member to the outer tubular member. Furthermore, the second end of the outer tubular member is preferably devoid of a separate end cap affixed thereto.

In some embodiments, one or more venting apertures may be defined on the otherwise substantially closed second end of the outer tubular member and/or the base member. The venting apertures may be adapted to promote convection flow to dissipate thermal energy generated at least by the heating element and may further reduce oxide buildup on an interior surface of at least the outer tubular member.

An infrared heat lamp consistent with the present disclosure has a cement-free configuration, which in turn may address adherence issues and further eliminate the risk of detachment of one or more components from the heat lamp. The cement-free configuration may further result in a more simplified and cleaner manufacturing process, a reduction in required labor and cost of assembly, as well as the required number of inspection checks and certification. Furthermore, the space to manufacture an infrared heat lamp consistent with the present disclosure is more compact and requires less energy to manufacture.

Figure 3:
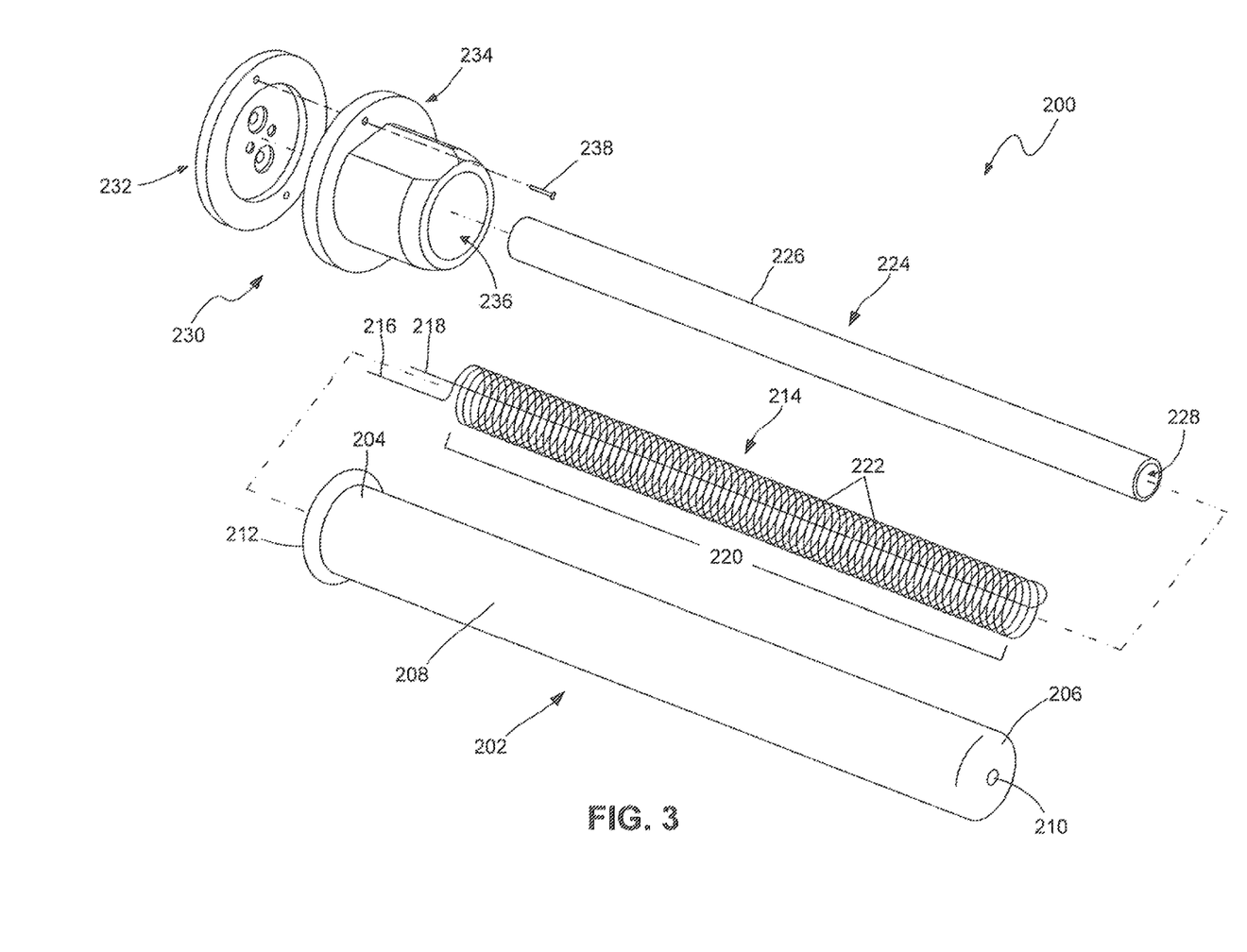
FIG. 3 illustrates an exploded perspective view of an infrared heat lamp consistent with the present disclosure.

Turning now to the drawings, FIG. 3 is an exploded perspective view of an infrared heat lamp 200 consistent with the present disclosure. In the illustrated embodiment, the infrared heat lamp 200 includes an outer tubular member 202 having an open first end 204, a second end defining a terminal wall 206 and a cavity 208 defined between the first and second ends 204, 206 and extending the length of the outer tubular member 202. In the illustrated embodiment, the second end 206 may have a dome-like shape, although, it should be noted that the second end 206 may have a variety of different shapes and/or dimensions. The second end 206 further includes at least one aperture 210 defined on a portion thereof. As described in greater detail herein, the aperture 210 is adapted to provide ventilation for the cavity 208 of the outer tubular member 202 during operation of the heat lamp 200. The open first end 204 of the outer tubular member 202 includes a flange member 212 defined along an outer periphery thereof.

The infrared heat lamp 200 further includes a heating element 214 having first and second terminal ends 216, 218 and a coiled portion 220 including a plurality of turns 222 defined between the first and second terminal ends 216, 218. The infrared heat lamp 200 further includes an inner tubular member 224 adapted to provide support and insulation for the heating element 214. In an assembled state (shown in FIG. 6, for example) the heating element 214 is wound about an outer surface 226 of the inner tubular member 224. In particular, the plurality of turns 222 of the coiled portion 220 are wound about the outer surface 226 and at least a portion of the second terminal end 218 is disposed within a passageway 228 defined within and extending the length of the inner tubular member 224. The passageway 228 is adapted to insulate a portion of the second terminal end 218 disposed within from other portions of the heating element 214, such as, for example, the turns 222 of the coiled portion 220. The cavity 208 of the outer tubular member 202 is shaped and/or sized to receive the heating element 214 and inner tubular member 224 within.

The infrared heat lamp 200 further includes a base member 230 adapted to be coupled to at least the outer tubular member 202 and retain the heating element 214 and inner tubular member 224 within the cavity 208 of the outer tubular member 202. In the illustrated embodiment, the base member 230 has first and second discrete portions 232, 234 adapted to be coupled to one another and retain at least the flange member 212 of the open first end 204 of the outer tubular member 202 therebetween. The second portion 234 of the base member 230 includes an opening 236 through which the outer tubular member 202 passes, wherein, when assembled, the second portion 234 surrounds a portion of the outer tubular member 202 adjacent to the flange member 212. The first and second portions 232, 234 of the base member 230 are secured to one another by at least one fastener 238, as described in greater detail herein. Accordingly, the infrared heat lamp 200 is preferably devoid of an adhesive in an amount effective to secure the base member 230 to the outer tubular member 202.

Figure 4:
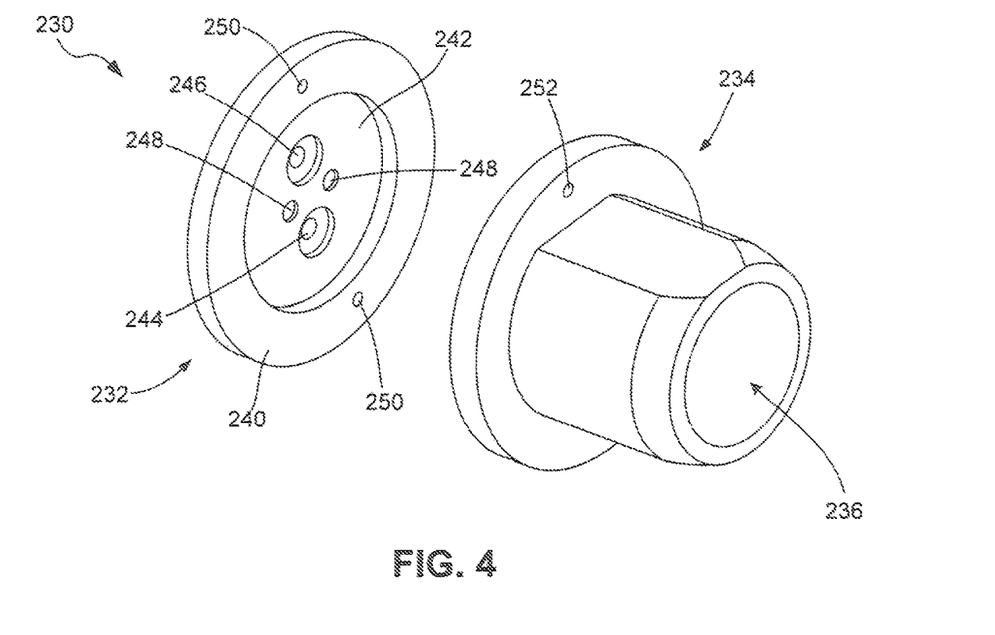
FIGS. 4 and 5 illustrate front and rear perspective views of the base member of the infrared heat lamp of FIG. 3 consistent with the present disclosure.
Figure 5:
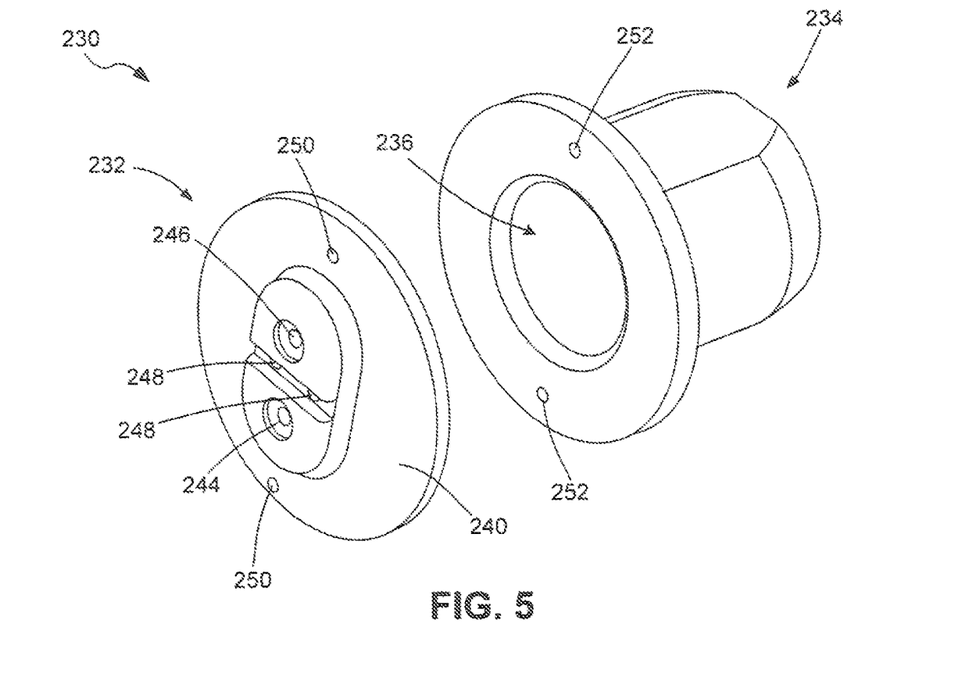

FIGS. 4 and 5 illustrate front and rear perspective views of the base member 230 of the infrared heat lamp 200 of FIG. 3 consistent with the present disclosure. As shown, the first portion 232 of the base member 230 has a body 240 having recessed portion 242 defined thereon. The recessed portion 242 is shaped and/or sized to receive and retain the flange member 212 of the open first end 204 of the outer tubular member 202 within. The first portion 232 further preferably includes a first opening 244 and a second opening 246 defined on a portion thereof through which the first and second terminal ends 216, 218 of the heating element 214 extend, respectively, when the heat lamp 200 is assembled (shown in FIG. 7, for example).

The first portion 232 further preferably includes at least one aperture 248 defined on the recessed portion 242. The at least one aperture 248 may be adapted to provide ventilation for at least the cavity 208 of the outer tubular member 202, particularly during operation of the heating lamp 200. For example, the aperture 210 defined on the second end 206 of the outer tubular member 202 and the apertures 248 defined in the recessed portion 242 of the first portion 232 of the base member 230 may be adapted to promote convection flow to dissipate thermal energy generated at least by the heating element 214 during operation of the heat lamp 200 and may further reduce oxide buildup on an interior surface of at least the outer tubular member 202. The first portion 232 further includes one or more openings 250 shaped and/or sized to receive corresponding fasteners 238, as described in greater detail herein.

As previously described, the second portion 234 of the base member 230 includes an opening 236. The opening 236 is shaped and/or sized to receive and allow the outer tubular member 202 to pass through. The second portion 234 further includes one or more openings 252 corresponding to the openings 250 defined on the first portion 232 and shaped and/or sized to receive fasteners 238 to secure the first and second portions 232, 234 to one another.

As generally understood, the first and second portions 232, 234 are composed of a durable material adapted to withstand high temperature applications. For example, in the illustrated embodiment, the first and second portions 232, 234 include a ceramic material. It should be noted that the first and second portions 232, 234 may include other known materials.

Figure 6:
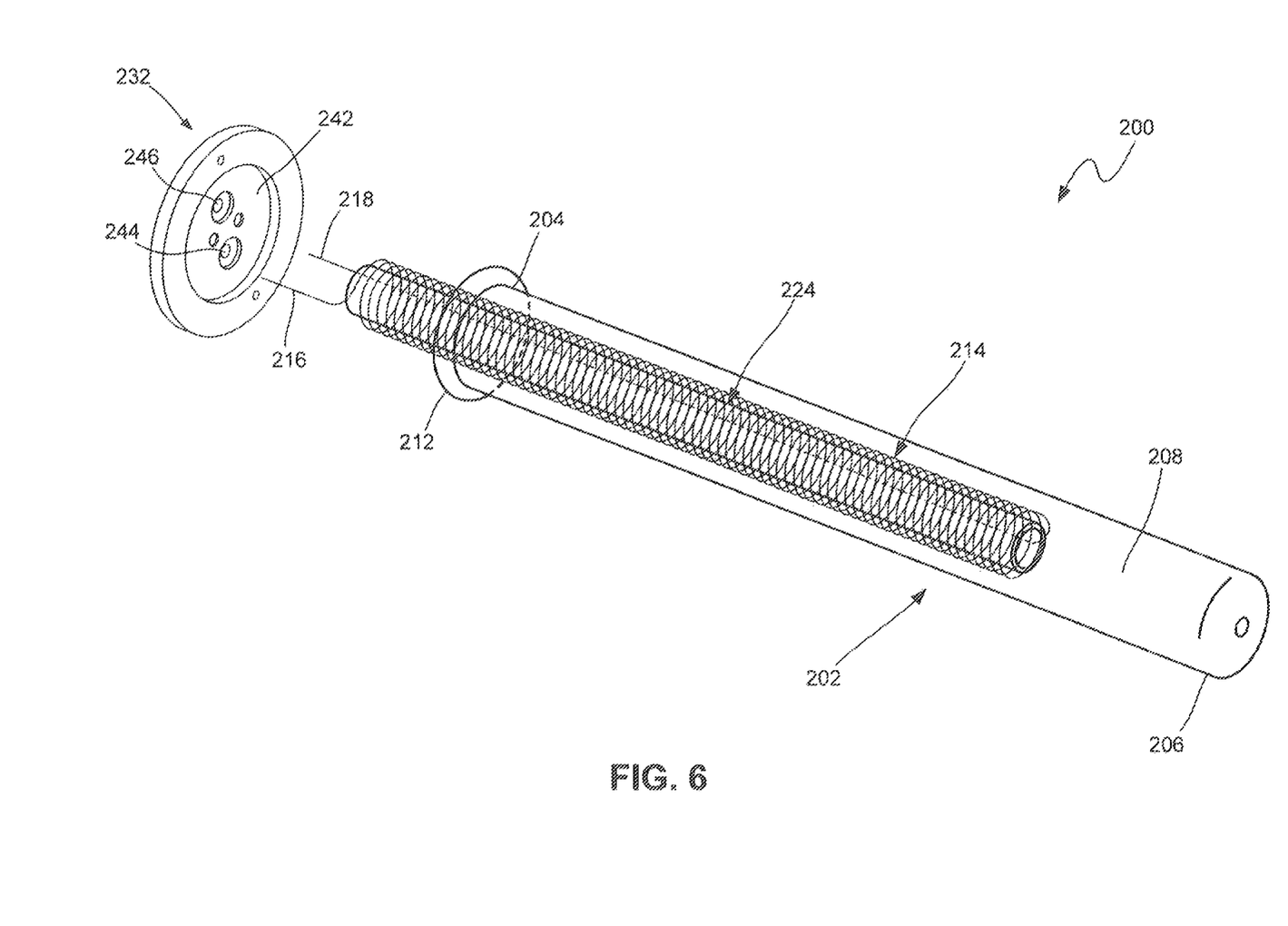
FIGS. 6 and 7 illustrate perspective views of the infrared heat lamp of FIG. 3 in partially assembled states.
Figure 7:
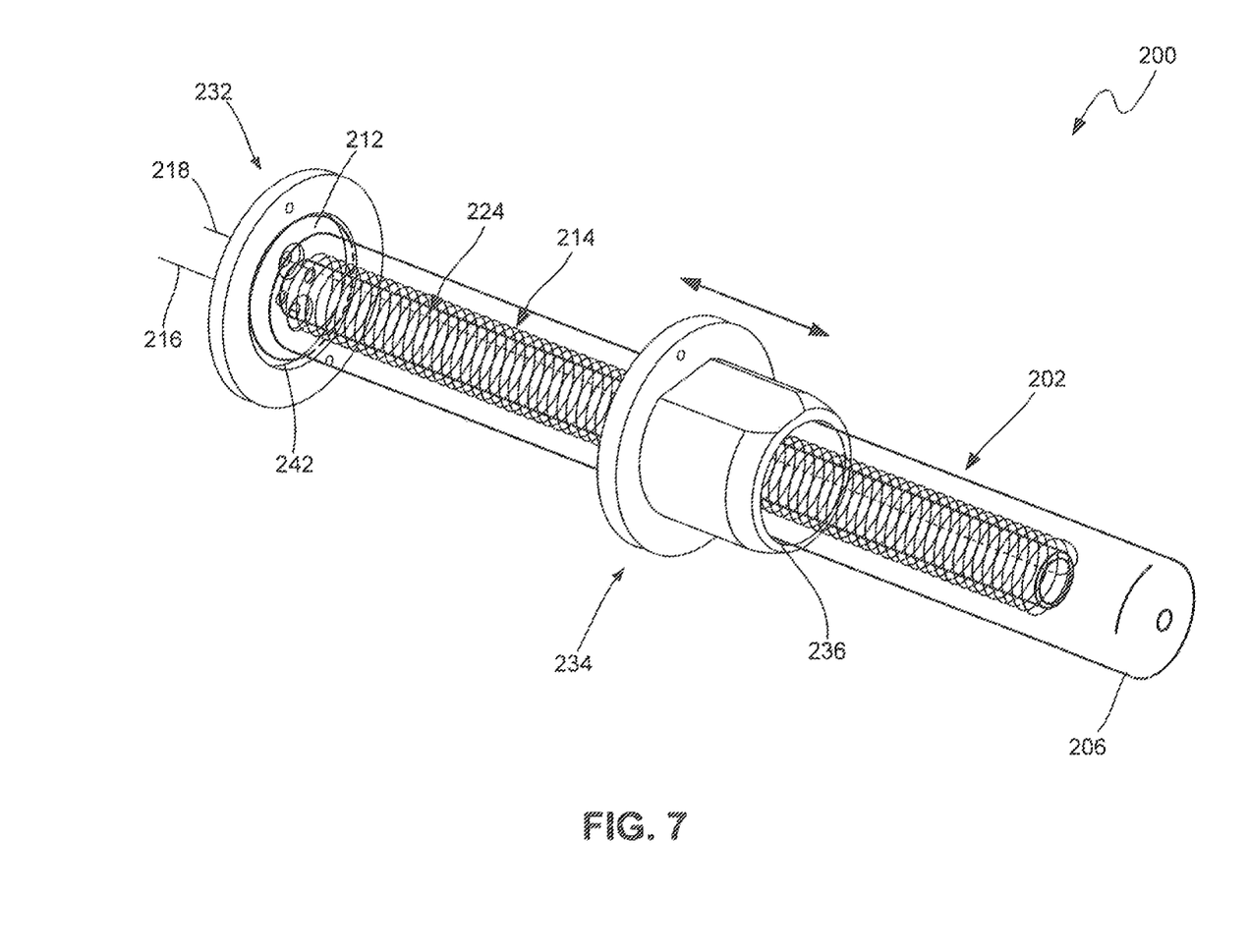
Figure 8:
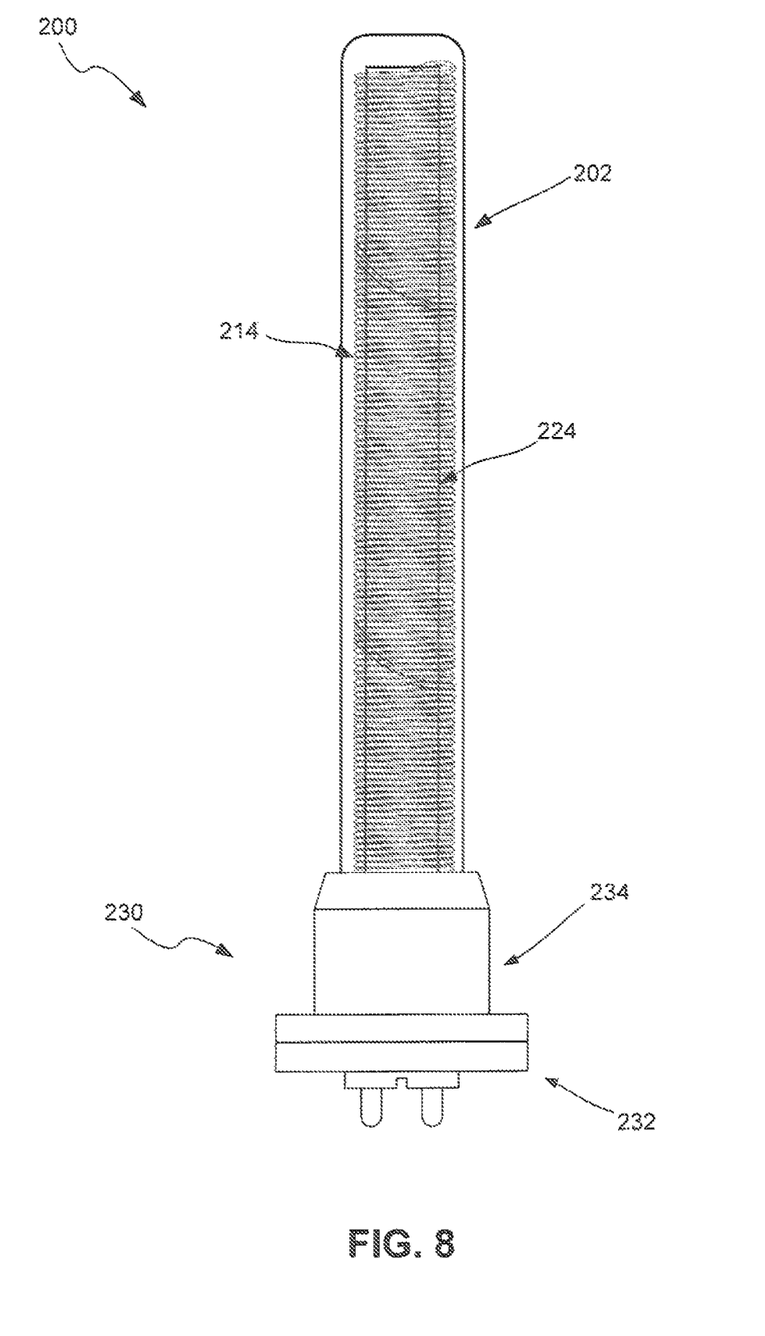
FIG. 8 illustrates a side view of the infrared heat lamp of FIG. 3 in an assembled state.

FIGS. 6 and 7 illustrate perspective views of the infrared heat lamp of FIG. 3 in partially assembled states and FIG. 8 illustrates a side view of the infrared heat lamp of FIG. 3 in an assembled state. Referring to FIG. 6, the heating element 214 is wound around and supported by the inner tubular member 224 and both are received within the open first end 204 and disposed within the cavity 208 of the outer tubular member 202. As shown in FIG. 7, the first and second terminal ends 216, 218 of the heating element 214 are received within and extend through the first and second openings 244, 246, respectively, of the first portion 232. Additionally, the open first end 204 of the outer tubular member 202 abuts the first portion 232. More specifically, the flange member 212 is received within the recessed portion 242 of the first portion 232. The outer tubular member 202 is received within and passes through the opening 236 of the second portion 234 of the base member 230, such that the second portion 234 may generally move along a length of the outer tubular member 202, as indicated by the arrow, and be positioned in relation to the first portion 232 so as to be secured thereto by the fasteners 238. For example, the first and second portions 232, 234 are positioned relative to one another so as to align the openings 250, 252 to allow fasteners 238 to be received and secure the first and second portions 232, 234 to one another. When the first and second portions 232, 234 of the base member 230 are secured to one another, the flange member 212 of the outer tubular member 202 is retained between the first and second portions 232, 234.

Figure 9:
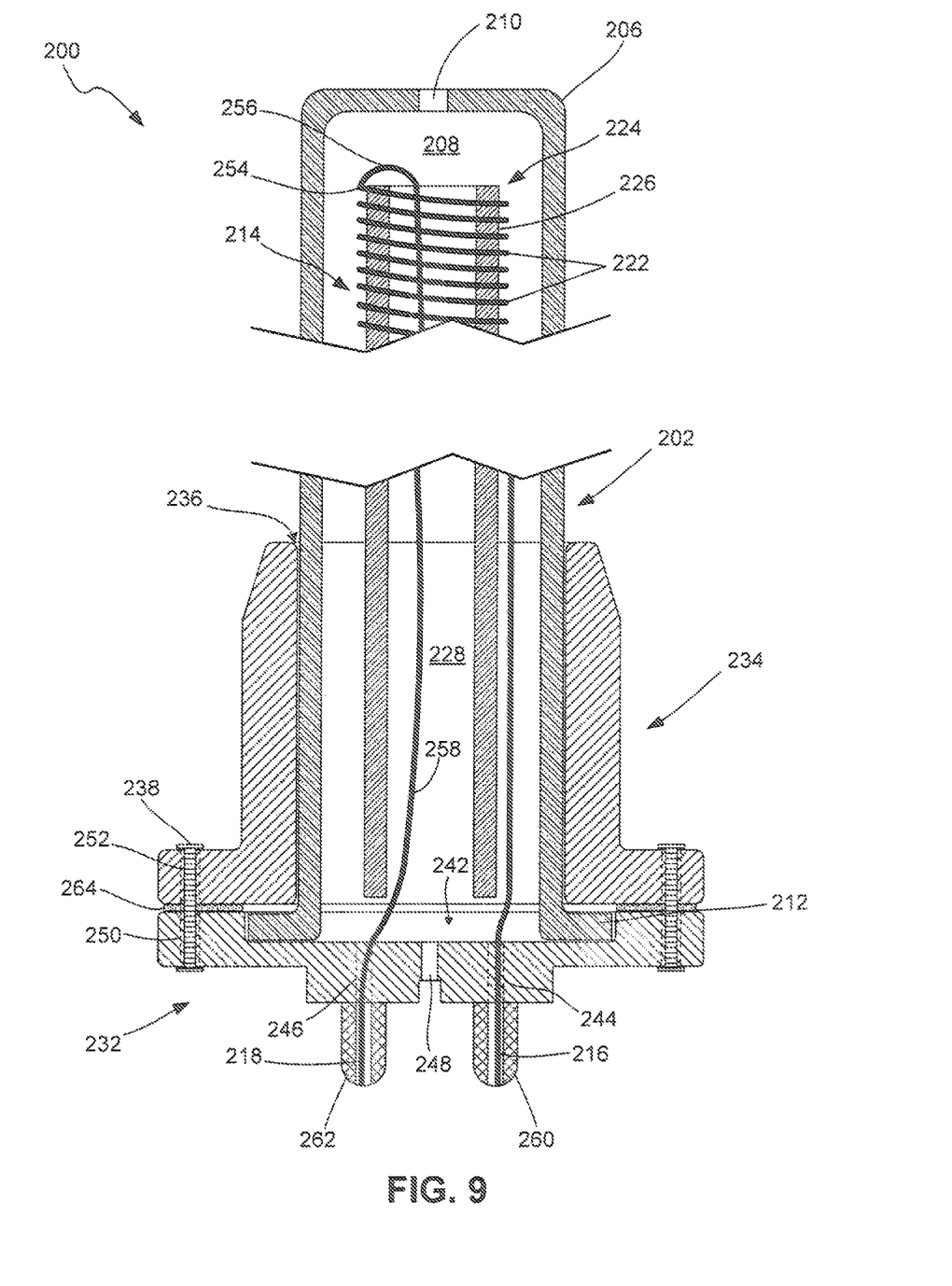
FIG. 9 illustrates a cross-sectional view of the infrared heat lamp of FIG. 8.

FIG. 9 illustrates a cross-sectional view of the infrared heat lamp of FIG. 8. It should be noted that internal features and/or surfaces are illustrated in phantom in FIG. 9. As shown, the inner tubular member 224 and the heating element 214 wound around the inner tubular member 224 are disposed within cavity 208 of the outer tubular member 202. As previously described, a portion of the second terminal end 218 of the heating element 214 is disposed within and insulated by the passageway 228 of the inner tubular member 224. As shown, a portion 254 of the heating element 214 extends from the turns 222 of the coiled portion 220 and forms an arcuate portion 256 bending in direction towards the passageway 228 of the inner tubular member 224. An insulated portion 258 further extends from the accurate portion 256 and through the inner tubular member 224 by way of the passageway 228 and terminates at the second terminal end 218. A portion of the first terminal end 216 extends from the turns 222 of the coiled portion 220 and is disposed along an exterior of the inner tubular member 224 within the cavity 208 of the outer tubular member 202 and terminates at the first terminal end 218. The first and second terminal ends 216, 218 extend through the first and second openings 244, 246, respectively, of the first portion 232 of the base member 230. In the illustrated embodiment, the first and second terminal ends 216, 218 terminate at first and second conductor tips 260, 262, respectively.

As shown, the flange member 212 of the outer tubular member 202 is retained between the first and second portions 232, 234 of the base member 230. The first and second portions 232, 234 are secured to one another by way of fasteners 238. In the illustrated embodiment, the fasteners 238 include rivets, such as, for example, oval head rivets, or bolts. The fasteners 238 have sufficient clamping force to hold the first and second portions 232, 234 together without the use of additional adhesive or cement. The openings 250, 252 of the first and second portions 232, 234 are aligned with one another to allow portions of the rivets 238 to pass therethrough and secure the first and second portions 232, 234 to one another. It should be noted that in other embodiments, other known fasteners may be included. When assembled, the second portion 234 surrounds a portion of the outer tubular member 202 adjacent to the flange member 212.

In some embodiments, the heat lamp 200 may further include a mica material 264 disposed between the first and second portions 232, 234 of the base member 230. The layer of mica material 264 may be adapted to compensate for movement of the first and second portions 232, 234 relative to one another. For example, the mica material 264 may reduce ceramic rattling of the first and second portions 232, 234. The mica material also helps to compensate possible warp of the ceramic material of first and second portions 232, 234 of the base member 230.

As previously described, the second end 206 of the outer tubular member 202 may include an aperture 210 defined on a portion thereof. Additionally, the first portion 232 of the base member 230 may also include an aperture 248 defined thereon. As shown, the apertures 210, 238 may provide convection flow to dissipate thermal energy generated at least by the heating element 214 and may further reduce oxide buildup on an interior surface of at least the outer tubular member 202.

During operation, an electric current passes through the heating element 214 and causes the heating element 214 to emit infrared radiation. More specifically, electric current may pass through the heating element 214 via the first and second terminal ends 216, 218, thereby heating and causing the heating element 214, specifically the coiled portion 220, to emit infrared radiation.

The heating element 214 includes a single continuous wire, wherein the wire is a flexible, resilient, and durable material configured to be bent and/or shaped into a desired dimension, such as the plurality of turns 222. The heating element 214 includes electrically conductive filament material(s) configured to withstand high temperatures and/or heat, including, but not limited to, tungsten, carbon, alloys of iron, chromium and aluminum, and/or combinations thereof. For example, the heating element 214 may include a heating alloy containing iron-chromium-aluminium (Fe-CrAl) sold under the trade designation KANTHAL® offered by Sandvik Group of Sweden.

The outer tubular member 202 includes a material configured to withstand high temperatures and/or heat and may be transmissive to infrared radiation. In one embodiment, the outer tubular member 202 includes a heat-resistant quartz (fused silica) glass material. Similarly, the inner tubular member 224 includes a material configured to withstand high temperatures and/or heat and is transmissive to infrared radiation. In one embodiment, the inner tubular member 224 includes a heat-resistant quartz (fused silica) glass material. The inner tubular member 224 may be made of high temperature ceramic, such as, for example, alumina, steatite or cordierite.

As generally illustrated, the infrared heat lamp 200 is devoid of an adhesive in an amount effective to secure the base member 230, including the first and second portions 232, 234, to the outer tubular member 202. Furthermore, the second end 206 of the outer tubular member 202 is devoid of a separate end cap affixed thereto. Accordingly, an infrared heat lamp consistent with the present disclosure has a cement-free configuration, which in turn may address adherence issues and further eliminate the risk of detachment of one or more components from the heat lamp. The cement-free configuration may further result in a more simplified and cleaner manufacturing process, a reduction in required labor and cost of assembly, as well as the required number of inspection checks and certification. Furthermore, the space to manufacture an infrared heat lamp consistent with the present disclosure is more compact and requires less energy to manufacture.

Consistent with one embodiment of the present disclosure, an infrared heat lamp 200 includes an outer tubular member 202 having an open first end 204, a second end defining a terminal wall 206 and a cavity 208 defined between the first and second ends 204, 206. The open first end 204 has a flange member 212 defined along an outer periphery thereof. The infrared heat lamp 200 further includes a heating element 214 having first and second terminal ends 216, 218 and a coiled portion 220 defined between the first and second terminal ends 216, 218, wherein at least a portion of the heating element 214 is positioned within the cavity 208 of the outer tubular member 202. The infrared heat lamp 200 further includes a base member 230 having first and second discrete portions 232, 234 coupled to one another and retaining the flange member 212 of the open first end 204 of the outer tubular member 202 therebetween. The second portion 234 of the base member 230 includes an opening 236 through which the outer tubular member 202 passes and the second portion 234 surrounds a portion of the outer tubular member 202 adjacent to the flange member 212. The first and second portions 232, 234 of the base member 230 are secured to one another by way of at least one fastener 238.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The following is a non-limiting list of reference numerals used in the specification:

- 100 prior art infrared heat lamp
- 102 outer tubular member
- 104 heating element
- 106 first terminal end of heating element
- 108 second terminal end of heating element
- 110 inner tubular member
- 112 first end cap
- 114 second end cap
- 200 infrared heat lamp
- 202 outer tubular member
- 204 open first end of outer tubular member
- 206 second end of outer tubular member
- 208 cavity of outer tubular member
- 210 aperture in second end of outer tubular member
- 212 flange member of outer tubular member
- 214 heating element
- 216 first terminal end of heating element
- 218 second terminal end of heating element
- 220 coiled portion of heating element
- 222 turns of coiled portion of heating element
- 224 inner tubular member
- 226 outer surface of inner tubular member
- 228 passageway of inner tubular member
- 230 base member
- 232 first portion of base member
- 234 second portion of base member
- 236 opening of second portion of base member
- 238 fastener(s) for coupling first and second portions of base member
- 240 body of first portion of base member
- 242 recessed portion of body of first portion
- 244 first opening in first portion of base member for first terminal end
- 246 second opening in first portion of base member for second terminal end
- 248 aperture(s) in first portion of base member
- 250 opening(s) in first portion of base member for receiving fastener(s)
- 252 opening(s) in second portion of base member for receiving fastener(s)
- 254 portion of heating element extending from coiled portion
- 256 arcuate portion of heating element
- 258 insulated portion of second terminal end of heating element
- 260 first conductor tip for first terminal end
- 262 second conductor tip for second terminal end
- 264 mica layer positioned between first and second portions of base member

What is claimed is:

1. A heat lamp (200) comprising:
an outer tubular member (202) having an open first end (204), a second end defining a terminal wall (206) and a cavity (208) defined between said first and second ends (204, 206), said open first end (204) having a flange member (212) defined along an outer periphery thereof;
a heating element (214) having first and second terminal ends (216, 218) and a coiled portion (220) defined between said first and second terminal ends (216, 218), at least a portion of said heating element (214) being positioned within said cavity (208) of said outer tubular member (202);
a base member (230) comprising first and second discrete portions (232, 234) coupled to one another and retaining said flange member (212) of said open first end (204) of said outer tubular member (202) therebetween, wherein said second portion (234) of said base member (230) includes an opening (236) through which said outer tubular member (202) passes and said second portion (234) surrounds a portion of said outer tubular member (202) adjacent to said flange member (212); and
at least one fastener (238) securing said first and second portions (232, 234) of said base member (230) to one another.

2. The heat lamp of claim 1, wherein said heat lamp (200) is devoid of an adhesive in an amount effective to secure said base member (230) to said outer tubular member (202).

3. The heat lamp of claim 1, wherein said second end terminal wall (206) of said outer tubular member (202) is devoid of a separate end cap affixed thereto.

4. The heat lamp of claim 1, wherein said second end terminal wall (206) is substantially closed.

5. The heat lamp of claim 1, wherein said second end terminal wall (206) defines an outermost lamp surface most distal from said base member (230).

6. The heat lamp of claim 1, wherein said flange member (212) abuts said first portion (232) of said base member (230).

7. The heat lamp of claim 1, wherein said first portion (232) of said base member (230) has a body (240) having a recessed portion (242) defined thereon shaped and/or sized to receive and retain the flange member (212) of said open first end (204) of said outer tubular member (202) within.

8. The heat lamp of claim 7, wherein said body (240) of said first portion (232) has a first opening (244) and a second opening (246) through which said first and second terminal ends (216, 218) of said heating element (214) extend, respectively.

9. The heat lamp of claim 7, wherein said body (240) of said first portion (232) has at least one aperture (248) defined on said recessed portion (242) and adapted to provide ventilation for at least said cavity (208) of said outer tubular member (202).

10. The heat lamp of claim 1, wherein said first and second portions (232, 234) of said base member (230) are coupled to one another by at least one rivet.

11. The heat lamp of claim 1, wherein at least one aperture (210) is defined on a portion of said second end (206) of said outer tubular member (202) and being adapted to provide ventilation for said cavity (208) of said outer tubular member (202).

12. The heat lamp of claim 1, further comprising mica material (264) positioned between said first and second portions (232, 234) of said base member (230).

13. The heat lamp of claim 1, wherein said heating element (214) comprises an iron-chromium-aluminum alloy material.

14. The heat lamp of claim 1, further comprising an inner tubular member (224) positioned within said cavity (208) of said outer tubular member (202), wherein said coiled portion (220) of said heating element (214) is wound around at least a portion of an outer surface (226) of said inner tubular member (224), said inner tubular member (224) providing support and electrical insulation for said heating element (214).

15. The heat lamp of claim 1, wherein said heating element (214) comprises an electrical resistance filament configured to emit infrared radiation when electric current is coupled to and passed through at least one of said first and second terminal ends (216, 218).

16. The heat lamp of claim 1, wherein said flange member (212) is retained, in an axial direction, between said first portion (232) and said second portion (234) of said base member (230).

17. The heat lamp of claim 1, wherein said outer tubular member (202) is transmissive to infrared radiation.

* * * * *